United States Patent
Andre et al.

(10) Patent No.: US 8,920,189 B1
(45) Date of Patent: Dec. 30, 2014

(54) WING DEPLOYMENT MECHANISM FOR A POWER ADAPTER

(71) Applicant: Apple Inc., Cupertino, CA (US)

(72) Inventors: Bartley K. Andre, Palo Alto, CA (US); Cesar Lozano Villarreal, Santa Clara, CA (US); Christopher J. Stringer, Woodside, CA (US); Mikael M. Silvanto, San Francisco, CA (US); Ricardo A. Mariano, Hayward, CA (US)

(73) Assignee: Apple Inc., Cupertino, CA (US)

( * ) Notice: Subject to any disclaimer, the term of this patent is extended or adjusted under 35 U.S.C. 154(b) by 83 days.

(21) Appl. No.: 13/916,275

(22) Filed: Jun. 12, 2013

(51) Int. Cl.
*H01R 13/72* (2006.01)
*F16C 11/04* (2006.01)

(52) U.S. Cl.
CPC .............. *H01R 13/72* (2013.01); *F16C 11/04* (2013.01)
USPC .......................................... 439/501

(58) Field of Classification Search
CPC .......................... H01R 35/04; H01R 13/62933
USPC ............... 439/131, 157, 372, 630, 501
See application file for complete search history.

(56) References Cited

U.S. PATENT DOCUMENTS

| | | | | |
|---|---|---|---|---|
| 5,819,894 | A * | 10/1998 | Okamoto | 191/12.4 |
| 6,698,560 | B2 * | 3/2004 | Reardon et al. | 191/12 R |
| 7,004,785 | B2 * | 2/2006 | Melton et al. | 439/501 |
| 8,096,626 | B2 * | 1/2012 | Tang | 312/223.2 |
| 2009/0168372 | A1 * | 7/2009 | Tang | 361/748 |
| 2011/0089012 | A1 * | 4/2011 | Tang et al. | 200/522 |

* cited by examiner

*Primary Examiner* — Neil Abrams
*Assistant Examiner* — Phuongchi T Nguyen
(74) *Attorney, Agent, or Firm* — Kilpatrick Townsend & Stockton LLP

(57) ABSTRACT

A power adapter including a wing deployment mechanism for retaining a wing in a first undeployed position and the second deployed position. One example may provide a housing, a spring, a spring cover, and the wing. In one example, the wing may be pivotally attached to the housing and the spring and the spring cover may be fixedly attached to the housing. The spring may contact a portion of the wing and may, in one example, apply a position dependent force to the wing that biases the wing towards either the first or the second position.

23 Claims, 5 Drawing Sheets

WING DEPLOYMENT MECHANISM FOR A POWER ADAPTER

BACKGROUND OF THE INVENTION

Mobile devices such as laptop and notebook computers, media players, smart phones, tablets, and others have become ubiquitous in the last few years and the popularity shows no sign of abating. To meet demand, designers have developed a wide range of devices having a constellation of form factors and features.

While features and form factors of devices have changed and evolved over time, these mobile devices rely on stored power and the maintenance of usable stored charge levels to perform their functions. In many of these devices, power is stored within one or several batteries.

As the batteries of the mobile device require frequent recharging, the user interaction with the power adapter can increase or decrease the overall level of user satisfaction with the mobile device. The user interaction with the power adapter can be of particular importance to overall user satisfaction when the charger affects the mobility of the mobile device such as, for example, when the power adapter is bulky. Additionally, because power adapters are frequently used, the features and perceived quality of the power adapter also affect the level of overall user satisfaction with the mobile device. Thus, apparatuses, systems, and methods are needed to improve the function of power adapters.

DETAILED DESCRIPTION OF THE INVENTION

Figure 1:
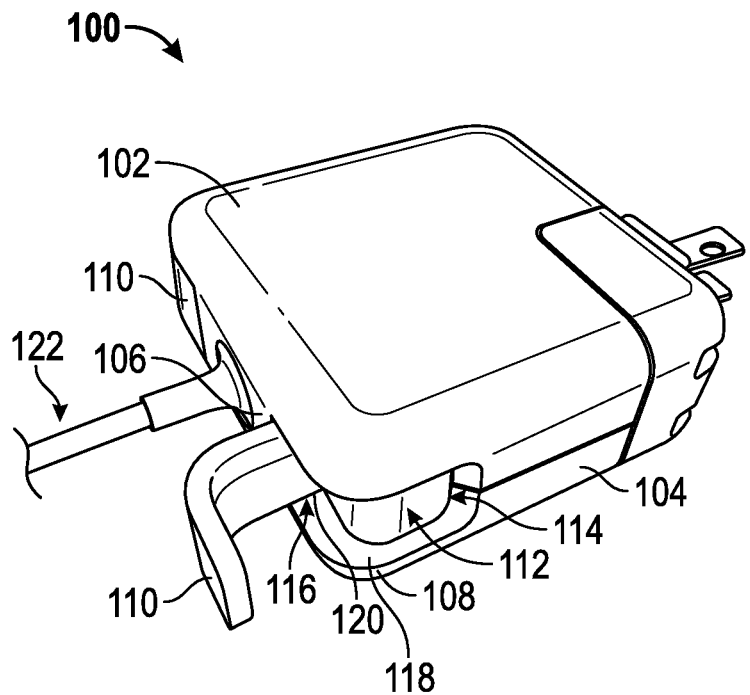
FIG. 1 is a perspective view of one embodiment of a power adapter with a wing deployment mechanism.

Some embodiments relate to a wing deployment mechanism which can facilitate moving a wing between a first undeployed (closed) position and a second deployed (open) position. The wing deployment mechanism can include a power adapter, also referred to as a power supply, and adapter, and/or a power brick herein. The power adapter is a device that supplies electric power to an electrical load. In some embodiments, the power adapter may include an electric power converter that converts one form of electrical energy to another, and in some embodiments, the power adapter may include a regulated power supply that controls the output voltage or current to a specific value.

The wing deployment mechanism may include one or several wings, which can be elongate members. The one or several wings can be pivotally attached to the power adapter and be movable between the first, undeployed position and the second, deployed position. In some embodiments, the wings can be configured for use in retaining a cable of the power adapter such as, for example, and outlet power cable. In some embodiments, the wings can be configured for use in managing and/or organizing the cable of the power adapter when the power adapter is not in use.

In some embodiments, one of the one or several wings can interact with a spring which can apply a restorative force to the one of the one or several wings when the wing is in the first or second position. This force biases the wing towards either the first or second position when the wing is intermediately located between the first and second positions. In some embodiments, for example, the spring can provide a first force in a first direction, and after a toggle point has been passed, provide a second force in a second direction. In some embodiments, the combination of the spring and the surface of the wing with which the spring interacts can generate a first torque in a first direction, and after a toggle point has been passed, provide a second torque in a second direction. In some embodiments, the first force, the second force, the first torque, and/or the second torque can be constant or variable. In some embodiments, the magnitude of the first force and the second force and/or the magnitude of the first torque and the second torque can be equal or different. In some embodiments, for example, the direction of the first force and the second force and/or the direction of the first torque and the second torque can be opposite.

The toggle point can be located at any desired intermediate position between the first position and the second position, and can, in some embodiments, be located at a midpoint between the first and second positions. In some embodiments, for example, in which the movement between the first and second position is through 90 degrees, the toggle point can be located at 45 degrees, between 40 and 50 degrees, between 35 and 55 degrees, between 30 and 60 degrees, and/or at any other or intermediate position. The spring can include a portion that deflects when the wing is moved from the first position to the second position. In some embodiments, the spring can be positioned relative to the pivot point of the wing so as to minimize torque variations during the movement of the wing between the first and the second positions, so that the deflected portion of the spring does not contact other components of the wing deployment mechanism, and/or so that the toggle point, the point, including the range, at which direction of the bias force applied by the spring to the wing changes from towards one of the first and second positions to towards the other of the first and second positions is located at approximately the midpoint between the first and second positions.

With reference now to FIG. 1, a perspective view of one embodiment of a power adapter 100 is shown. As discussed above, power adapter 100 can supply electric power to an electrical load, and specifically to a mobile device. Power adapter 100 may include a variety of shapes and sizes and can be made from a variety of materials. In some embodiments, power adapter 100 may include a variety of components configured to, for example, control the voltage and/or current output of power adapter 100, and/or convert received electrical energy from, for example, alternating current to direct current.

In the embodiment depicted in FIG. 1, power adapter 100 includes a housing 102. Housing 102 contains and/or protects some and/or all of the components of power adapter 100. In some embodiments, housing 102 can, alone and/or in combination with other components of power adapter 100, define the volume in which some and/or all of the components of power adapter 100 are retained. Housing 102 may include a variety of shapes and sizes and can be made from a variety of materials. Housing 102 depicted in FIG. 1 includes a rectangular prism and is made from plastic.

Housing 102 of power adapter 100 includes a first surface 104 and a second surface 106. In the embodiment depicted in FIG. 1, first and second surfaces 104, 106 are sides of housing 102. First and second surfaces 104, 106 intersect each other at a corner 108. In some embodiments, corner 108 may include any desired angle, and corner 108 depicted in FIG. 1 includes an approximately 90° angle, which can include angles within 45°, 25°, 15°, or 5° of 90°.

Power adapter 100 depicted in FIG. 1 further includes a wing 110, and specifically includes two wings 110. As seen in FIG. 1, one of wings 110 is in the first, undeployed position and the other of wings 110 is in the second, deployed position. Wing 110 may include an elongate member that can be pivotally connected with housing 102 of power adapter 100 so as to allow wing 110 to move between the first and second positions. In the embodiment depicted in FIG. 1, wing 110 includes a bent elongate element having portions extending in perpendicular directions. Advantageously, in some embodiments, the angle between the portions of the wing can correspond to the angle of corner 108 and the position of the pivotable connection between wing 110 and housing 102 can be configured so that wing 110 can extend around corner 108 when wing 110 is in the first, undeployed position.

Housing 102 can include a receiving depression 112. Receiving depression 112 can be sized and shaped to receive wing 110, and specifically sized and shaped to receive wing 110 so that portions of wing 110 are flush with first and second surfaces 104, 106 of housing 102 when wing 110 is in the first, undeployed position. In some embodiments, receiving depression 112 may include a free end 114 and a pivot end 116 and can be bounded by a sidewall 118. In some embodiments, sidewall 118 may include a pivot receptacle 120 located proximate to pivot end 116 of receiving depression 112. Pivot receptacle 120 can be configured to receive a mating pivot (not shown) located on wing 110.

In some embodiments, power adapter 100 may include a power output 122. Power output 122 may include a cable configured to carry power from power adapter 100 to the mobile device. In some embodiments, power output 122 can be located between wings 110, and can be configured to be stored by wrapping power output 122 around wings 110 when wings 110 are in the second, deployed position.

Figure 2:
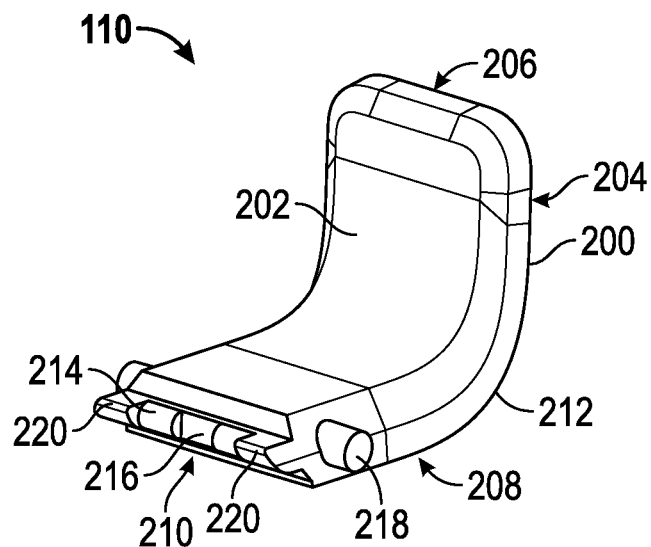
FIG. 2 is a perspective view of one embodiment of a wing.

With reference now to FIG. 2, a perspective view of one embodiment of wing 110 is shown. Wing 110 may include a variety of shapes and sizes, and can be made from a variety of materials. Wing 110 may include a top 200 and bottom 202, and in some embodiments, for example, wing 110 may include a first portion 204, also referred to herein as a free portion, a free end 206, a second portion 208, also referred to herein as a cam portion and/or a pivot portion, and a pivot end 210, also referred to herein as a cam end. In the embodiment depicted in FIG. 2, first portion 204 extends in a first direction and second portion 208 extends in a second direction that is nonparallel to the first direction. As further seen in FIG. 2, first portion 204 and second portion 208 intersect and define a wing corner 212. In some embodiments, the angle subtended by the intersection of first portion 204 and second portion 208 can match and/or correspond to the angle subtended by the intersection of first surface 104 and second surface 106 of housing 102. Advantageously, in such an embodiment top 200 of wing 110 is flush with first and second surfaces 104, 106 on housing 102, and specifically top 200 of first portion 204 is flush with first surface 104 of housing 102 and top 200 of second portion 208 is flush with second surface 106 of housing 102, when wing 110 is in the first, undeployed position.

In some embodiments, wing 110 can include a variety of features located at and/or proximate to pivot end 210 of wing 110. In some embodiments, wing 110 can include a cam 214. In some embodiments, cam 214 can be configured to interact with a spring (e.g., spring 300 shown in FIG. 3) to facilitate the transfer of force from spring 300 to wing 110, which force facilitates retention of wing 110 in the first and second positions and biases wing 110 towards one of the first and second positions when wing 110 is intermediately located between the first and second positions. In some embodiments, and as specifically depicted in FIG. 2, cam 214 may include a half cylinder that is tangent with one or both of top 200 and bottom 202 of wing 110. As further seen in some embodiments, cam 214 may include two portions separated by a control opening 216. In some embodiments in which wing 110 is created by, for example, injection molding, control opening 216 can be created by the removal of sprue and/or runner material and can facilitate proper operation of cam 214.

As further seen, in FIG. 2, pivot end 210 of wing 110 can include a pivot 218 that laterally extends from between top 200 and bottom 202 of wing 110. In the embodiment depicted in FIG. 2, pivot 218 includes a cylindrical protrusion that can be sized and shaped to be received within pivot receptacle 120 of housing 102.

In some embodiments, wing 110 can include a stop 220 located at pivot end 210. In some embodiments, stop 220 can be configured to interact with features of power adapter 100 including, for example, features of housing 102 to limit the movement of wing 110, and specifically, to limit the movement of wing 110 past one or both of the first and second positions. In the specific embodiment depicted in FIG. 2, stop 220 can be configured to interact with a component of power adapter 100 including, for example, a feature and/or component of housing 102 to stop wing 110 from moving past the second, deployed position.

Stop 220 may include a variety of shapes and sizes. In the embodiment depicted in FIG. 2, stop 220 includes a flat face proximate to bottom 202 of wing 110, which flat face can be configured to abut one or several features of power adapter 100 and/or of housing 102 to stop the movement of wing 110.

Figure 3:
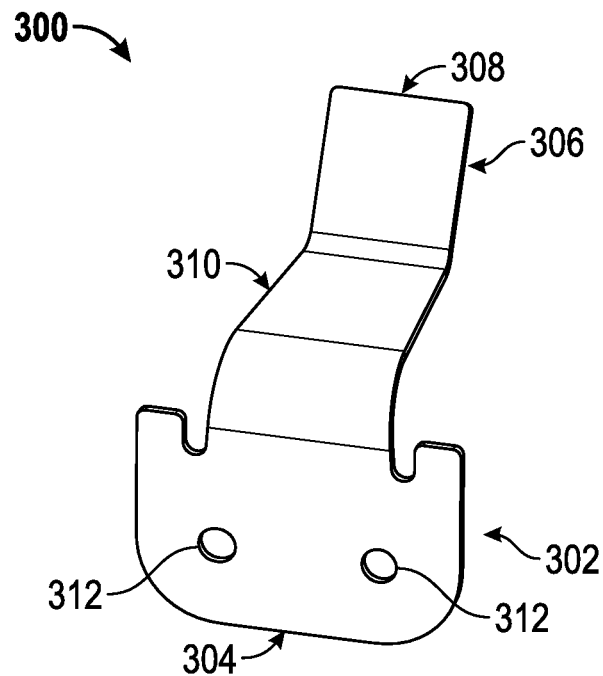
FIG. 3 is a perspective view of one embodiment of a spring.

With reference now to FIG. 3, a perspective view of one embodiment of spring 300 is shown. Spring 300 can be configured to bias wing 110 towards one of the first and second positions based on the location of wing 110. Spring 300 may include a variety of shapes and sizes and can be made from a variety of materials. In the embodiment depicted in FIG. 3, spring 300 includes a fixation portion 302, also referred to herein as a first portion and a fixed end 304 located at the end of spring 300 proximate to fixation portion 302. In some embodiments, spring 300 further includes a contacting portion 306, also referred to herein as a second portion, and a biasing end 308 located at the end of spring 300 proximate to contacting portion 306. As also depicted in FIG. 3, fixation portion 302 of spring 300 can, in some embodiments, be connected with contacting portion 306 via a connecting portion 310.

Fixation portion 302 of spring 300 can be configured for affixation to a portion of power adapter 100. In some embodiments, fixation portion 302 may include a substantially planar member that can include one or several affixation features 312. These affixation features 312 can include, for example, one or several holes extending through fixation portion 302. In some embodiments, these features can be configured to receive a fixing component such as, for example, a post, rivet, a screw, a bolt, an adhesive, or any other component or feature that can fix the position of spring 300.

Contacting portion 306 can be configured to engage with cam 214 of wing 110 to apply a biasing force to wing 110. In some embodiments, contacting portion 306 may include a substantially planar member that can be sized and shaped to fit between stops 220 of wing 110 and engage with cams 214 located between stops 220.

Figure 4:
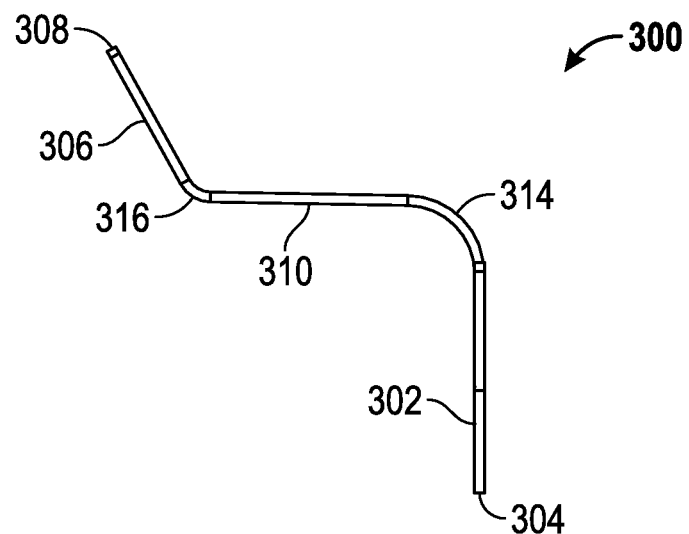
FIG. 4 is a side view of one embodiment of the spring.

With reference now to FIG. 4, a side view of one embodiment of spring 300 is shown. As seen in FIG. 4, spring 300 includes a fixed end 304, a fixation portion 302, a connecting portion 310, a contacting portion 306, and a biasing end 308. As also seen in FIG. 4, each of fixation portion 302, contacting portion 306, and connecting portion 310 comprise substantially planar members which extend in nonparallel directions. Thus, fixation portion 302 and connecting portion 310 intersect and form a deflection corner 314. Deflection corner 314 may include an angle that can correspond to the angle of corner 108 of housing 102 and/or to the angle of wing corner 212. In some embodiments, and although the angle of deflection corner 314 corresponds to the angle of corner 108 of housing 102 and to the angle of wing corner 212, the radius of curvature of deflection corner 314 can be different than the radius of curvature of one or both of corner 108 of housing 102 and wing corner 212. In one specific embodiment, for example, the radius of curvature of deflection corner 314 is smaller than the radius of curvature of corner 108 of housing 102 and smaller than the radius of curvature of wing corner 212. In some embodiments, the angle and the radius of curvature of deflection corner 314 can be configured so that fixation portion 302 of spring 300 can extend parallel to first surface 104 of housing 102 and connecting portion 310 can extend parallel to second surface 106 of housing 102 when spring 300 is attached to housing 102 and undeflected.

As further seen in FIG. 4, connecting portion 310 and contacting portion 306 intersect and form a bias corner 316. The angle and radius of curvature of bias corner 316 can be configured such that contacting portion 306 of spring 300 achieves and maintains a desired level of contact with cams 214 when wing 110 is in the first position, the second position or any intermediate location between the first and second positions.

Figure 5:
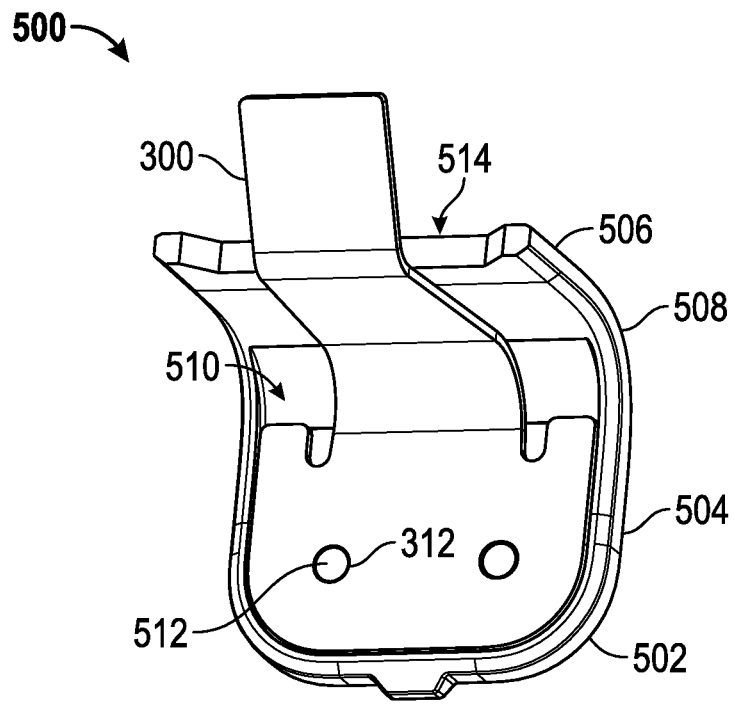
FIG. 5 is a perspective view of one embodiment of a spring affixed to a spring cover.

With reference now to FIG. 5, a perspective view of one embodiment of a bias system 500 is shown. Bias system 500 may include spring 300 and spring cover 502, and can be configured for connection with housing 102 so as to enable the application of a biasing force from spring 300 to wing 110 via cams 214 of wing 110.

Spring cover 502 can be configured to affix spring 300, to be affixed to housing 102, to define a retention space for spring 300 in cooperation with housing 102, and to abut portions of wing 110 when wing 110 is in the first and/or second positions. Spring cover 502 may include a variety of shapes and sizes and can be made from a variety of materials. In the embodiment depicted in FIG. 5, spring cover 502 includes a securement portion 504 extending in a first direction and retention portion 506 extending in a second direction. In some embodiments, securement portion 504 and retention portion 506 can intersect to create a cover corner 508. Cover corner 508 may include an angle that can correspond to the angle of corner 108 of housing 102, to the angle of wing corner 212, and/or to the angle of deflection corner 314. In some embodiments, although the angle of cover corner 508 corresponds to the angle of corner 108 of housing 102, to the angle of wing corner 212, and/or to the angle of deflection corner 314 of spring 300, the radius of curvature of cover corner 508 can be the same and/or different than the radius of curvature of one, some, or all of corner 108 of housing 102, wing corner 212, and/or deflection corner 314. In one specific embodiment, for example, the radius of curvature of cover corner 508 can be smaller than the radius of curvature of corner 108 of housing 102 and approximate the radius of curvature of bottom 202 of wing corner 212.

As further seen in FIG. 5, spring cover 502 can include a securement depression 510. Securement depression 510 may include a recessed area within securement portion 504 of spring cover 502 that can be sized and shaped to receive fixation portion 302 of spring 300. In some embodiments, securement depression 510 can have a depth that is greater than the thickness of spring 300, and specifically that is greater than the thickness of fixation portion 302 of spring 300.

As further seen in FIG. 5, securement portion 504 of spring cover 502 can include a securement feature 512. Securement feature 512 may include any feature configured to interact with a portion of spring 300 to thereby affix and/or secure spring 300 to spring cover 502. In some embodiments, securement feature 512 can include a feature and/or substance that is applied to securement portion 504 of spring cover 502 to affix and/or secure spring 300 to securement portion 504 such as, for example, an adhesive. In the embodiment depicted in FIG. 5, securement feature 512 can be configured to interact with affixation features 312 of spring 300 to thereby secure spring 300, and specifically to secure fixation portion 302 of spring 300 to securement portion 504 of spring cover 502.

Spring cover 502 can include a retention end 514. Retention end 514 can be the terminating end of spring cover 502 proximate to retention portion 506 of spring cover 502. In some embodiments, spring 300 can be positioned with respect to spring cover 502 such that bias corner 316 results in a portion of contacting portion 306 of spring 300 extending from one side of spring cover 502 to the other side of spring cover 502 as shown in FIG. 5.

Figure 6:
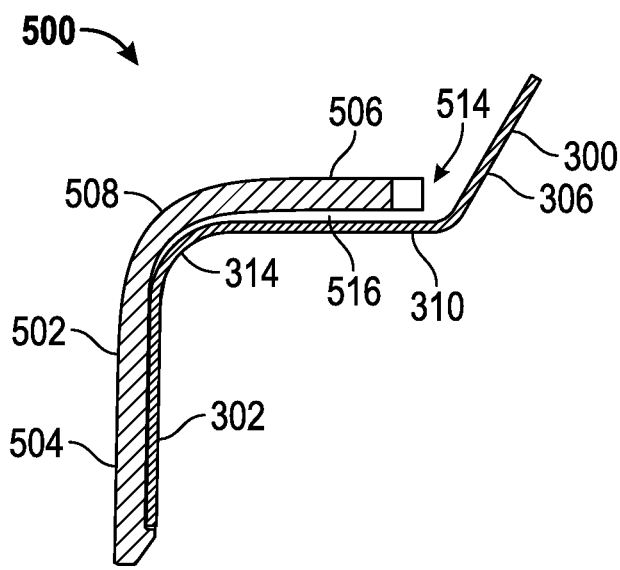
FIG. 6 is a section view of one embodiment of the spring affixed to the spring cover.

With reference now to FIG. 6, a side, section view of one embodiment of bias system 500 is shown. As seen in FIG. 6, fixation end 302 of spring 300 abuts securement portion 504 of spring cover 502. As further seen in FIG. 6, deflection corner 314 is positioned within cover corner 508, but the different radius of curvature of deflection corner 314 as compared to cover corner 508 results in the creation of a retention gap 516 between connecting portion 310 of spring 300 and retention portion 506 of spring cover 502. As further seen in FIG. 6, connecting portion 310 can extend past retention end 514 of spring cover 502, and contacting portion 306 can extend across retention gap 516 and from one side of spring cover 502 to the other side of spring cover 502, and specifically from one side of retention portion 506 of spring cover 502 to the other side of retention portion 506 of spring cover 502.

Figure 7:
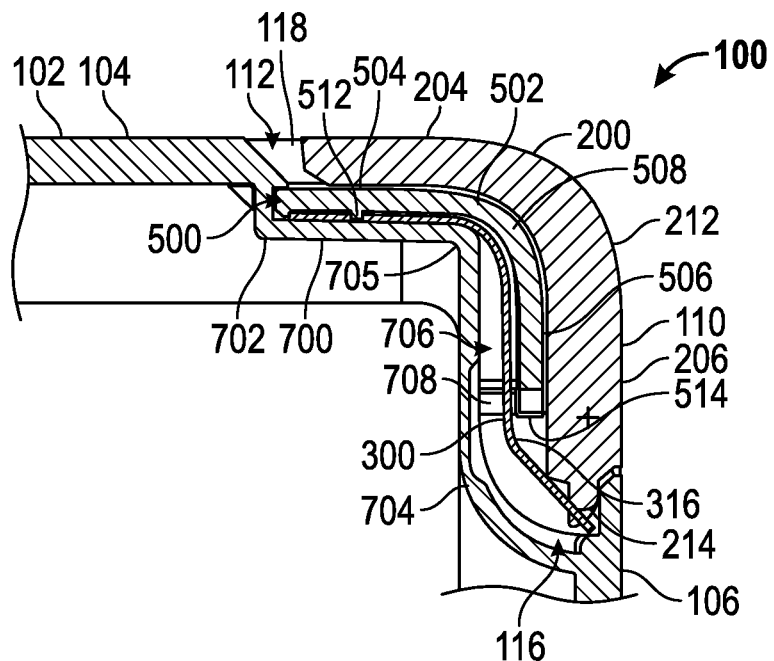
FIG. 7 is a partial section view of one embodiment of a wing deployment mechanism having a wing in an undeployed configuration.

With reference now to FIG. 7, a partial-section view of the wing deployment mechanism found in adapter 100 with wing 110 in an undeployed configuration is shown. As seen in FIG. 7, power adapter 100 includes housing 102, including first and second surfaces 104, 106 that intersect in corner 108. Housing 102 further includes receiving depression 112 that is sized and shaped to receive wing 110 when in the first position. Receiving depression 112 includes free end 114 and pivot end 116, and is bounded by sidewall 118 and a substrate 700. Substrate 700 can be a component of housing 102, and can form the bottommost boundary of receiving depression 112.

Substrate 700 can have a substrate fixation surface 702 that can, in connection with spring cover 502 fix the position of fixation portion 302 of spring 300, and a substrate pivot surface 704 that in connection with retention portion 506 of spring cover 502 defines a retention space 706, which retention space 706 includes retention gap 516, that retains the portion of spring 300 located between biasing end 308 and deflection corner 314 when wing 110 is in the first position, the second position, and/or is moved between the first and second positions. In the embodiment depicted in FIG. 7, retention space 706 retains connecting portion 310 of spring 300. As seen in FIG. 7, retention space 706 is sized and shaped so that contacting portion 306 and connecting portion 310 of spring 300 do not contact either retention portion 506 of spring cover 502 or substrate pivot surface 704 when wing 110 is in the second, deployed position.

Substrate fixation surface 702 and substrate pivot surface 704 intersect and create a substrate corner 705. Substrate corner 705 may include an angle that can correspond to the angle of corner 108 of housing 102, to the angle of the deflection corner 314, and/or to the angle of wing corner 212. In some embodiments, although the angle of substrate corner 705 corresponds to the angle of corner 108 of housing 102, to the angle of deflection corner 314, and/or to the angle of wing corner 212, the radius of curvature of substrate corner 705 can be different than the radius of curvature of those corners 108, 212, 314. In one embodiment, for example, the radius of curvature of substrate corner 705 is smaller than the radius of curvature of corner 108 of housing 102, smaller than the radius of curvature of wing corner 212, and smaller than the radius of curvature of deflection corner 314.

In the embodiment depicted in FIG. 7, wing 110 is in the first, undeployed position. In this position, first portion 204 of wing 110 is parallel to substrate fixation surface 702 and is perpendicular to second surface 106, and cam portion 208 of wing 110 is parallel to second surface 106 and perpendicular to substrate fixation surface 702.

As seen in FIG. 7, spring 300 contacts wing 110 via cam 214, and specifically, contacting portion 306 of spring 300 contacts cam 214 and thereby applies a force to wing 110. In some embodiments, this force can be a restorative force that induces a torque and can facilitate the retention of wing 110 in the first position. As further seen in FIG. 7, the movement of wing 110 past the first position is limited and/or restrained by the contacting of wing surfaces proximate to free end 206 of wing 110 with portions of spring cover 502. As further seen in FIG. 7, top 200 of first portion 204 of wing 110 is flush with first surface 104 of housing 102, and top 200 of cam portion 208 is flush with second surface 106 of housing 102 when wing 110 is in the first undeployed position.

In some embodiments, power adapter 100 can include a damper 708 that can damp the impact of stop 220 against the portion of housing 102 of power adapter 100 when wing 110 is moved to the second, deployed position. In some embodiments, this damper may include, for example, an elastic material such as, for example, rubber or silicon, and in some embodiments, this damper may include a viscous material such as, for example, grease, and/or a viscoelastic material such as, for example, memory foam.

Figure 8:
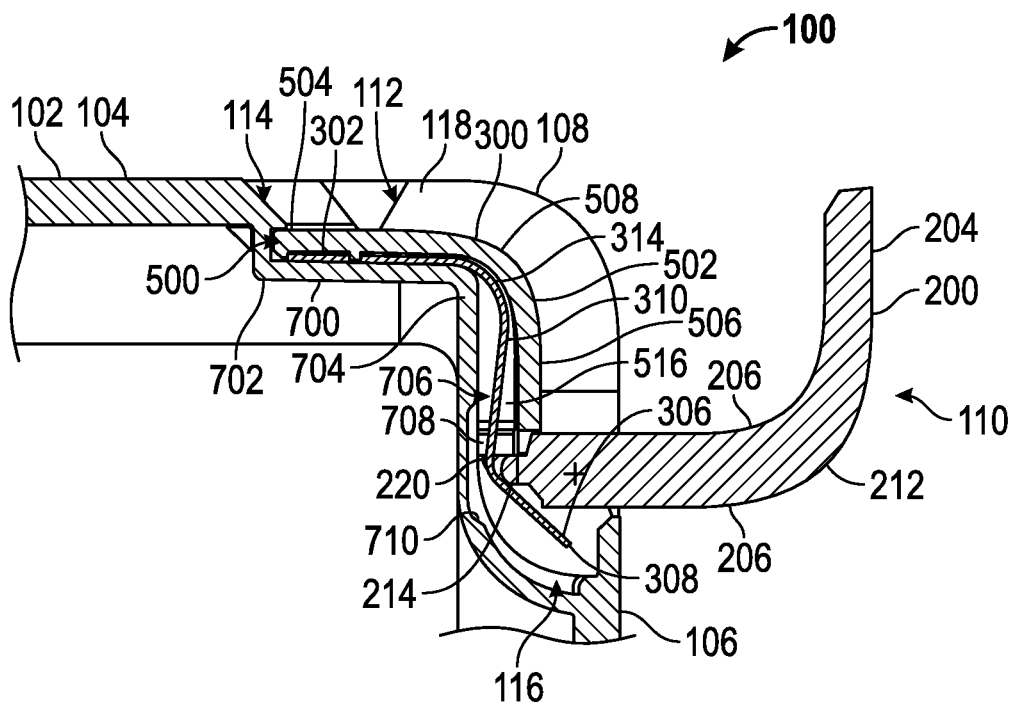
FIG. 8 is a partial section view of one embodiment of a wing deployment mechanism having a wing in a deployed configuration.

With reference now to FIG. 8, a partial-section view of one embodiment of the wing deployment mechanism found in power adapter 100 with wing 110 in the second, deployed configuration is shown. As seen in FIG. 8, power adapter 100 includes housing 102, which housing further includes first and second surfaces 104, 106 which together define corner 108 of housing 102. Housing 102 further includes a receiving depression 112 that is sized and shaped to receive wing 110 and that has, in FIG. 8, received wing 110. Receiving depression 112 is defined by sidewall 118 and substrate 700 that includes substrate fixation surface 702 and substrate pivot surface 704, which surfaces 702, 704 together create substrate corner 705.

In some embodiments, and as seen in FIG. 8, substrate pivot surface 704 can include a clearance depression 708 which can be positioned relative to spring 300 such that bias corner 316, portions of contacting portion 306, and portions of connecting portion 310 have greater clearance with substrate pivot surface 704. Advantageously, clearance depression 708 can facilitate allowing wing 110 to be moved from a first position to a second position without portions of spring 300 located between deflection corner 314 and biasing end 308 contacting substrate pivot surface 704.

Bias system 500 is placed within receiving depression 112 of housing 102. This includes spring 300 and spring cover 502. Spring cover 502 includes securement portion 504 that, with securement feature 512, secures spring 300. Spring cover 502 further includes retention portion 506 which, together with substrate pivot surface 704 defines retention space 706. In some embodiments, retention space 706 can extend from substrate corner 705 to retention end 514 of spring cover 502 and/or to pivot end 116 of receiving depression 112, and in some embodiments retention space 706 can extend from the start of deflection corner 314 proximate to fixation portion 302 to retention end 514 of spring cover 502 and/or to pivot end 116 of receiving depression 112.

In the embodiment depicted in FIG. 8, wing 110 is in the second, deployed position. In this position, first portion 204 of wing 110 is perpendicular to substrate fixation surface 702 and is parallel to second surface 106, and cam portion 208 of wing 110 is perpendicular to second surface 106 and parallel to substrate fixation surface 702.

As seen in FIG. 8, spring 300 contacts wing 110 via cam 214, and specifically, contacting portion 306 of spring 300 contacts cam 214 and thereby applies a force to wing 110 which in turn creates a torque to keep the wing in the open, deployed position. In some embodiments, this force can be a restorative force that can facilitate the retention of wing 110 in the second position. As further seen in FIG. 8, the movement of wing 110 past the second position is limited and/or restrained by the contacting of stop 220 with a portion of housing 102 of power adapter 100.

Figure 9:
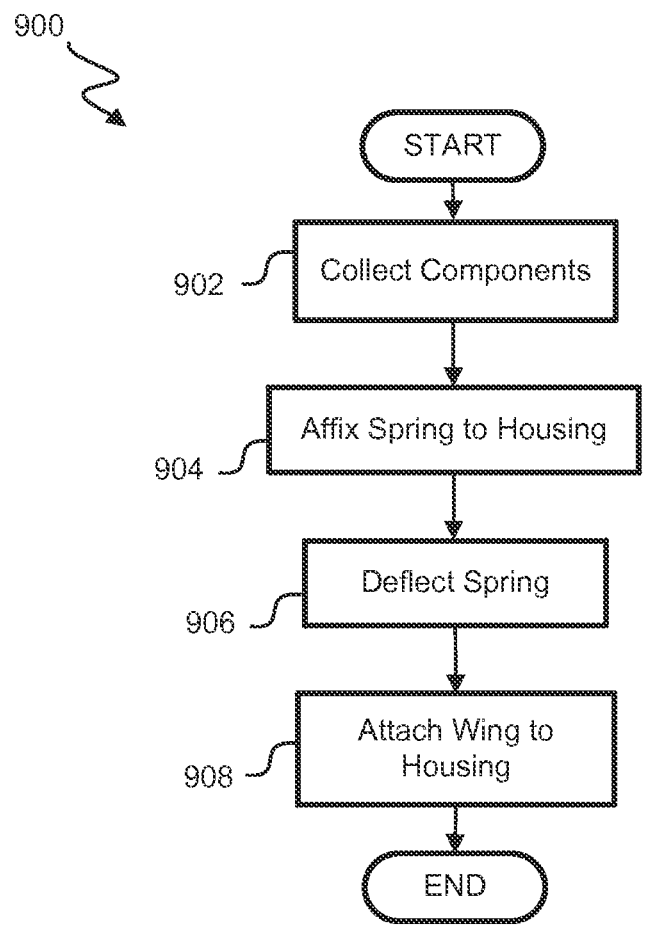
FIG. 9 is a flowchart illustrating one embodiment of a process for manufacturing a wing deployment mechanism.

With reference now to FIG. 9, a flowchart illustrating one embodiment of a process 900 for manufacturing a wing deployment mechanism is shown. In some embodiments, the wing deployment mechanism may include housing 102, wing 110, spring 300, and spring cover 502. In some embodiments, the wing deployment mechanism can be configured to stably retain wing 110 in a first, undeployed position and in a second, deployed position.

Process 900 begins in block 902 wherein the components of the wing deployment mechanism are collected. In some embodiments, for example, this can include collecting and/or selecting a housing 102 as described above, a wing 110 as described above, a spring 300 as described above, and/or a spring cover 502 as described above. In one specific embodiment, this can include selecting a spring including a fixation portion 302 that extends in a first direction and another portion, including one or both of contacting portion 306 and connecting portion 310, that extends in a second direction relative to fixation portion 302.

After the components of the wing deployment mechanism have been collected, process 900 proceeds to block 904 wherein spring 300 is affixed to housing 102. In some embodiments, for example, this can include affixing fixation portion 302 of spring 300 to substrate fixation surface 702 of housing 102. In some embodiments, the affixing of spring 300 to housing 102 can include affixing spring 300 to spring cover 502, and specifically, affixing fixation portion 302 of spring 300 to securement portion 504 of spring cover 502 via affixation features 312 of spring 300 and securement feature 512 of spring cover 502, and subsequently affixing spring cover 502 to housing 102.

After spring 300 has been affixed to housing 102, process 900 proceeds to block 906 wherein spring 300 is deflected. In some embodiments, for example, spring 300 can be deflected by the interaction of wing 110 with spring 300, and in some embodiments, spring 300 can be deflected in preparation for the attachment of wing 110 to housing 102.

After spring has been deflected, process 900 proceeds to block 908 wherein wing 110 is attached to housing 102. In some embodiments, for example, wing 110 can be attached to housing 102 by pivotally connecting wing 110 to housing 102, and in some embodiments, wing 110 can be attached to housing 102 by the insertion of pivot 218 into pivot receptacle 120 of housing 102. In some embodiments, steps 908 and 906 can be concurrently performed in that the attachment of wing 110 to housing 102 can simultaneously result in the deflection of spring 300, and in some embodiments, steps 908 and 906 can be serially performed.

In some embodiments, the attaching of wing 110 to housing 102 can further include providing a damper 708 configured to damp the impact between stop 220 in housing 102. As discussed above, in some embodiments, damper 708 may include an elastic member and/or material and/or a viscous member and/or material.

The above description of embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated. Thus, it will be appreciated that the invention is intended to cover all modifications and equivalents within the scope of the following claims

What is claimed is:

1. An adapter comprising:
    a corner comprising intersecting first and second surfaces;
    a receiving depression extending around the corner, the receiving depression including a free surface having a free end located on the first surface and a pivot surface intersecting the free surface and having a pivot end located on the second surface;
    a pivotable wing comprising a free end and a cam end, the cam end including a cam and a pivot located between the cam and the free end, wherein the pivotable wing is moveable between a closed position and an open position; and
    a spring comprising a fixed end secured to the free end of the receiving depression and a biasing end located in the pivot end of the receiving depression and engaging with the cam of the pivotable wing so that the pivotable wing is stable in both the closed and open position.

2. The adapter of claim 1, wherein the cam comprises a half cylinder.

3. The adapter of claim 1, wherein the pivotable wing further comprises a stop adjacent to the cam.

4. The adapter of claim 1, wherein the spring and the cam create a first torque when the wing is in the closed position and a second torque when the wing is in the open position.

5. The adapter of claim 4, wherein the magnitude of the first torque is equal to the magnitude of the second toque.

6. The adapter of claim 4, wherein the direction of the first torque is opposite the direction of the second torque.

7. The adapter of claim 1, further comprising a spring cover, wherein the spring cover overlays the receiving depression and the spring and secures the fixed end of the spring to the free end of the receiving depression.

8. The adapter of claim 7, wherein the spring is retained between the spring cover and the pivot surface of the receiving depression.

9. The adapter of claim 8, wherein the spring does not contact the pivot surface of the receiving depression.

10. The adapter of claim 1, wherein the pivotable wing is sized and shaped to fit within the receiving depression when the pivotable wing is in the closed position.

11. The adapter of claim 10, wherein the pivotable wing comprises a first portion proximate to the free end and a second portion proximate to the cam end and intersecting the first portion to define a pivotable wing corner.

12. The adapter of claim 11, wherein the first portion of the pivotable wing fits within the receiving portion on the first surface and the second portion of the pivotable wing fits within the receiving portion on the second surface.

13. The adapter of claim 11, wherein the first portion of the pivotable wing is parallel with the first surface when the pivotable wing is in the first position and the first portion of the pivotable wing is parallel with the second surface when the wing is in the open position.

14. A wing deployment system comprising:
    a substrate comprising a fixation surface and an intersecting pivot surface, wherein the fixation and pivot surfaces are non-parallel;
    a wing member comprising a pivot portion comprising a pivot end and a cam proximate to the pivot end, wherein the pivot end is pivotally connected to the pivot surface of the substrate and the wing member is movable between a first position wherein the pivot portion is parallel to the pivot surface and a second position;
    a spring comprising a fixation portion affixed to the fixation surface and extending around the intersection of the fixation surface and the pivot surface and a contacting portion contacting the cam of the wing member, wherein the spring does not contact the pivot surface of the substrate.

15. The wing deployment system of claim 14, wherein the spring does not contact the pivot surface of the substrate when the wing member is in the first position.

16. The wing deployment system of claim 14, wherein the spring does not contact the pivot surface of the substrate when the wing member is at position between the first and second positions.

17. The wing deployment system of claim 14 further comprising a spring cover.

18. The wing deployment system of claim 17, wherein the spring does not contact the pivot surface of the substrate when the wing member is in the second position.

19. The wing deployment system of claim 17, wherein the spring cover affixes the fixation portion of the spring to the fixation surface of the substrate.

20. The wing deployment system of claim 19, wherein the spring is retained between the spring cover and the fixation surface of the substrate and between the spring cover and the pivot surface of the substrate.

21. A method of manufacturing a wing deployment mechanism comprising:

selecting a spring comprising a first portion extending in a first direction and a second portion extending in a second direction relative to the first portion;

affixing the first portion of the spring to a securement portion of a spring cover, the securement portion of the spring cover extending in a first direction and a retention portion of the spring cover extending in a second direction from the securement portion;

attaching the spring cover to a housing comprising a corner formed by the intersection of first and second surfaces such that the first portion of the spring is affixed to the housing between the securement portion of the spring cover and the first surface of the housing and such that both the second portion of the spring and the retention portion of the spring cover extend around the corner of the housing;

pivotally attaching a wing member to the housing, wherein a cam of the wing member engages with the spring, wherein the wing member is pivotable between a first position and second position, and wherein the spring applies a force to the wing member in both the first and second positions.

22. The method of claim 21, further comprising providing a damper to the wing deployment mechanism.

23. The method of claim 22, wherein the damper comprises a viscous material.

* * * * *